United States Patent
Danner et al.

(10) Patent No.: US 11,254,594 B1
(45) Date of Patent: *Feb. 22, 2022

(54) FLOATABLE SYSTEM AND METHOD FOR BIOLOGICALLY TREATING WASTEWATER USING LOW DENSITY, HIGH SURFACE AREA SUBSTRATES

(71) Applicant: ENTEX Technologies Inc., Chapel Hill, NC (US)

(72) Inventors: Jeffrey B. Danner, Chapel Hill, NC (US); Wayne J. Flournoy, Chapel Hill, NC (US)

(73) Assignee: ENTEX Technologies Inc., Chapel Hill, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/877,856

(22) Filed: May 19, 2020

Related U.S. Application Data (63) Continuation-in-part of application No. 16/147,144, filed on Sep. 28, 2018, now Pat. No. 10,676,382.

(60) Provisional application No. 62/565,800, filed on Sep. 29, 2017.

(51) Int. Cl.
| | |
|---|---|
| *C02F 3/10* | (2006.01) |
| *C02F 3/30* | (2006.01) |
| *C02F 3/20* | (2006.01) |
| *C02F 3/32* | (2006.01) |

(52) U.S. Cl.
CPC .............. *C02F 3/103* (2013.01); *C02F 3/20* (2013.01); *C02F 3/301* (2013.01); *C02F 3/307* (2013.01); *C02F 3/32* (2013.01)

(58) Field of Classification Search
CPC .... C02F 3/103; C02F 3/06; C02F 3/10; C02F 3/101; C02F 3/02; C02F 3/20
USPC ........................................................ 210/615
See application file for complete search history.

(56) References Cited

U.S. PATENT DOCUMENTS

| | | | |
|---|---|---|---|
| 5,468,392 A | 11/1995 | Hanson | 210/150 |
| 7,445,715 B2 * | 11/2008 | Pehrson | C02F 3/06 210/615 |
| 7,691,262 B2 | 4/2010 | Pehrson | 210/150 |
| D618,760 S | 6/2010 | Flournoy | D23/207 |
| 7,854,843 B2 | 12/2010 | Pehrson | 210/605 |
| D672,009 S | 12/2012 | Flournoy | D23/207 |
| 8,568,593 B1 | 10/2013 | Flournoy | 210/615 |
| D718,412 S | 11/2014 | Flournoy | D23/207 |
| D762,279 S | 7/2016 | Flournoy | D23/207 |
| 10,676,382 B1 | 6/2020 | Danner | C02F 3/103 |

(Continued)

*Primary Examiner* — Claire A Norris
(74) *Attorney, Agent, or Firm* — MacCord Mason PLLC (57) ABSTRACT

A treatment system of the present invention generally includes a floating support structure having an upper flotation assembly, a base assembly that secures the bottom edges of a plurality of low density sheets, and vertical frame members that connect the upper flotation assembly to the base assembly. The sheets are generally vertically oriented although able to flex and sway independently. Substantially all regions of substantially all sheets are aerated. The sheets are constructed of an open weave substrate that allows the diffusion of gas, nutrients and food, while protecting and serving as an attachment site for a variety of microbial colonies in both anoxic and aerobic zones. In use a system of the present invention is inserted into a wastewater reservoir, and aerated, for treatment of the wastewater.

16 Claims, 8 Drawing Sheets

(56) References Cited

U.S. PATENT DOCUMENTS

2007/0267344 A1  11/2007  Tharp ........................... 210/605

* cited by examiner

FLOATABLE SYSTEM AND METHOD FOR BIOLOGICALLY TREATING WASTEWATER USING LOW DENSITY, HIGH SURFACE AREA SUBSTRATES

CROSS-REFERENCE TO RELATED APPLICATION

This application is a Continuation in Part of U.S. patent application Ser. No. 16/147,144 filed Sep. 28, 2018, which claims the benefit of provisional patent application Ser. No. 62/565,800, filed Sep. 29, 2017. Related applications are entitled SYSTEM AND METHOD FOR BIOLOGICALLY TREATING WASTEWATER USING LOW DENSITY, HIGH SURFACE AREA SUBSTRATES. The non-provisional and provisional applications are hereby incorporated by reference in their entirety.

BACKGROUND OF THE INVENTION

Field of the Invention

This invention relates to a system and method for biologically treating water, and in particular to a floating treatment system and method having a plurality of vertically positioned low density, high surface area substrate sheets attached to a base frame.

Description of the Prior Art

Proper remediation of wastewater is critical to life, health and the environment. Many major advancements in human civilization and catastrophic historical events can be linked to the presence or absence of clean drinking water, and/or the presence or absence of contaminated water.

Wastewater treatment is the physical, chemical, and/or biological processes of removing contaminants from wastewater in order to produce water that is environmentally safer. Safe drinking water from a municipal water source is an example of treated wastewater.

Wastewater treatment has two major components: primary treatment removes contaminants including grease, dirt, gravel, and floatable waste; and secondary treatment removes additional suspended solids and pollutants. Secondary treatment often incorporates biological processes.

Known attached growth biological processes include moving bed bioreactors (MBBR), submerged fixed film (SFF), integrated fixed-film activated sludge (IFAS), and trickling filters or biofilters. Wastewater is intermittently or continuously flowed over or through the media. Microorganisms become attached to the media and form a biological layer or fixed film. Organic matter in the wastewater diffuses into the film, where it is metabolized. As organisms grow and reproduce, the biofilm thickness increases, with portions of the film periodically sloughing off.

In what are considered improvements on the aforementioned attached growth biological process technologies, a variety of growth media systems for treating wastewater, and module-based systems for treating wastewater, have evolved. The Applicant's patents listed herein are incorporated by reference in their entirety: System for treating wastewater and a controlled reaction-volume module usable therein, U.S. Pat. No. 7,445,715 B2, filed Nov. 22, 2005; Wastewater treatment method, U.S. Pat. No. 7,854,843 B2, filed Mar. 8, 2010; System for treating wastewater having a controlled reaction-volume module usable therein, U.S. Pat. No. 7,691,262 B2, filed Oct. 13, 2008; Media for supporting growth biology within a wastewater treating system, U.S. Pat. No. D718412 S1, filed Dec. 3, 2012; Extruded media for supporting growth biology within a wastewater treating system, U.S. Pat. No. D618760 S1, filed Nov. 2, 2009; Media for supporting growth biology within a wastewater treatment system, U.S. Pat. No. D762279 S1, filed Nov. 24, 2014; Anoxic system screen scour, U.S. Pat. No. 8,568,593 B1, filed Jun. 2, 2010; and Extruded media for supporting growth biology within a wastewater treating system, U.S. Pat. No. D672009 S1, filed Jun. 8, 2010.

Of particular relevance are modular wastewater treatment systems which employ a plurality of substrate sheets positioned in parallel, typically within a framework that secures each substrate sheet around the perimeter of the sheet, and an integrated aeration system. In use a modular wastewater treatment system is introduced into an opened or closed wastewater repository, such as a treatment lagoon or tank, and the substrate sheets are eventually colonized by microbes that remediate the contamination. Known modular wastewater treatment systems, however, have some shortcomings.

One negative aspect of known modular wastewater treatment systems is that each individual substrate sheet, usually four-sided, requires support on multiple sides in order to prevent the sheet from crumpling and sinking. This "framework" adds to the weight, cost, materials, and likelihood of failure of the system.

Another disadvantage of the framework is that each individual substrate sheet is substantially stationary. This means that biomass sloughs off at a slow rate—typically when the mass is too great to be supported by the substrate.

Another disadvantage of the framework is that the removal of one sheet, for example due to damage, is difficult since the adjacent sheets cannot easily be moved aside to make space for removal of the damaged sheet.

Another negative aspect of known wastewater treatment systems is that the substrates are less than ideal. More specifically, substrates tend to be fairly planar in overall shape, thereby providing little protection for emerging microbial colonies.

Another disadvantage of known fairly planar substrates is that they provide a habitat for a limited number of microbial species, thereby limiting the variety of wastes that can be consumed within the biofilm.

Another disadvantage of known fairly planar substrates is that they don't provide a steep and sustained gradient of oxygen concentration. An oxygen gradient is required to allow development of both aerobic and anoxic zones, thereby simultaneously facilitating nitrification and denitrification.

Another disadvantage of known modular wastewater treatment systems is that they typically rest on the bottom surface of the body of water such as lagoon or tank. Bottom surfaces are problematic for a variety of reasons include presence of sludge; uneven terrain which causes modular system to rest in unlevel positions; undesirable bottom surface material such as clay or membrane lining; and/or presence of appurtenances such as diffusers and/or piping.

Another disadvantage of known modular wastewater treatment systems is that they typically must be mounted to the bottom surface of wastewater tank or lagoon, which is labor intensive, may require draining, and makes the system difficult to move.

As can be seen, there is a need for a wastewater treatment system that doesn't require a framework for substrate sheets. It is desirable that the system facilitates shedding excess biomass. It is also desirable that substrate sheets in the system can be replaced fairly quickly and easily. It is also desirable that the system includes a substrate that physically protects emerging microbial colonies, provides a habitat to a wide variety of microbial species, and lends itself to providing a steep and sustained oxygen concentration gradient. It is also desirable that the system can be used in practically any wastewater body without the need for draining or dredging to install or move. It is also desirable that the system maintains a fairly stable orientation of its own accord.

SUMMARY OF THE INVENTIONS

A treatment system of the present invention generally includes an upper flotation assembly that maintains the upper portion of the treatment system at or near the surface of water, a base assembly that secures the bottom edge of a plurality of sheets, and multiple vertical frame members that connect the upper flotation assembly to the base assembly.

At least one aerator releases air to the sheets via a plurality of spaced apart diffusers, thereby aerating substantially all regions of substantially all sheets.

The sheets are preferably flexible and constructed of a high surface area substrate. The density of the sheets can provide buoyancy in wastewater so the sheets are generally vertical, but able to flex and sway independently. This movement facilitates sloughing off of biomass, and the removal and replacement of individual sheets as desired.

The open weave structure of the substrate allows gas, nutrients and food to diffuse, yet provides protection and attachment sites for emerging microbial colonies. Also, both anoxic and aerobic zones emerge, thereby allowing simultaneous nitrification and denitrification within the same system. The system supports a variety of growth including AOB, NOB, PAO and annamox microorganisms

DETAILED DESCRIPTION AND THE PREFERRED EMBODIMENTS

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Figure 1:
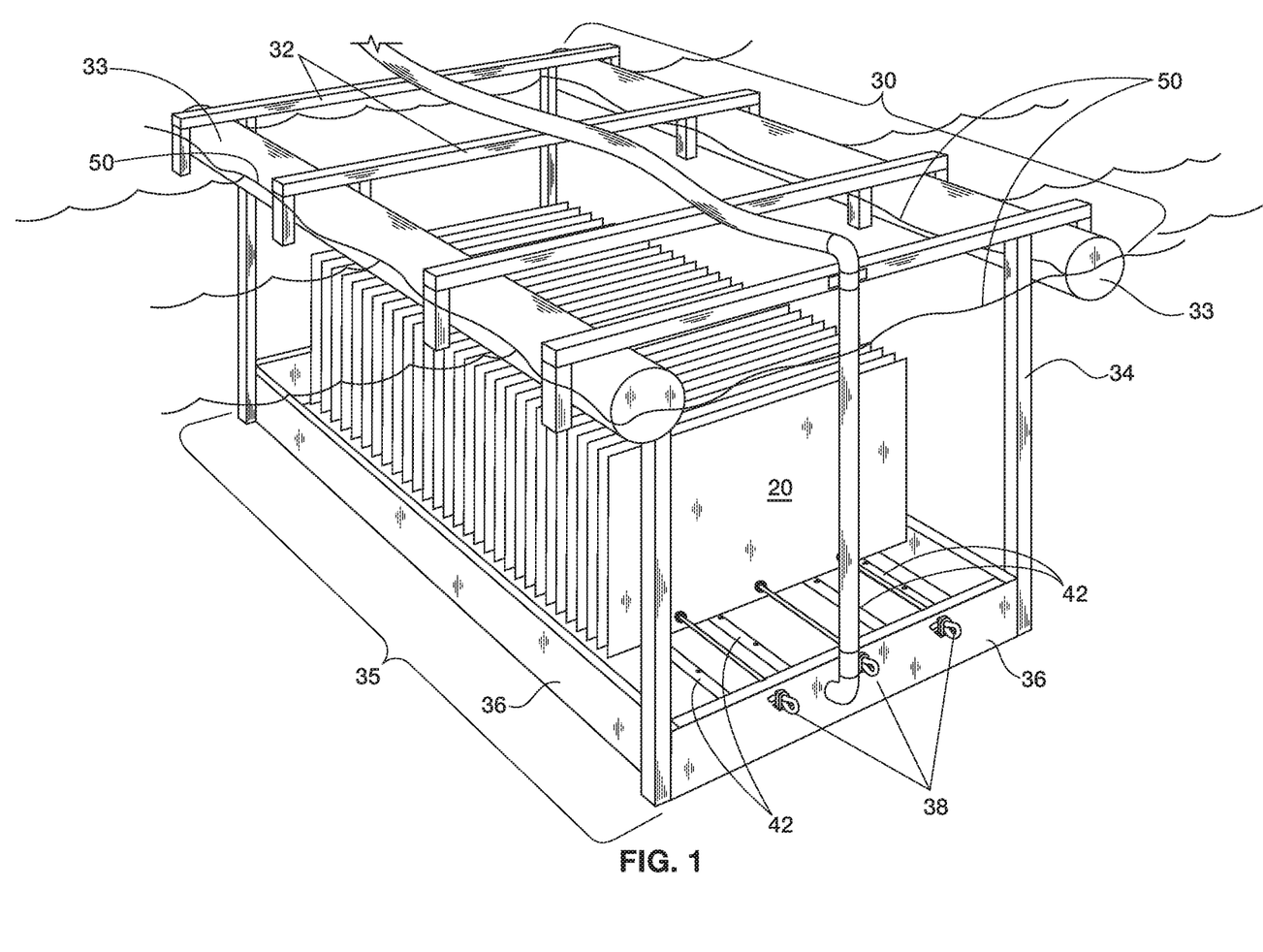
FIG. 1 is a perspective depiction of the present invention in water.
Figure 2:
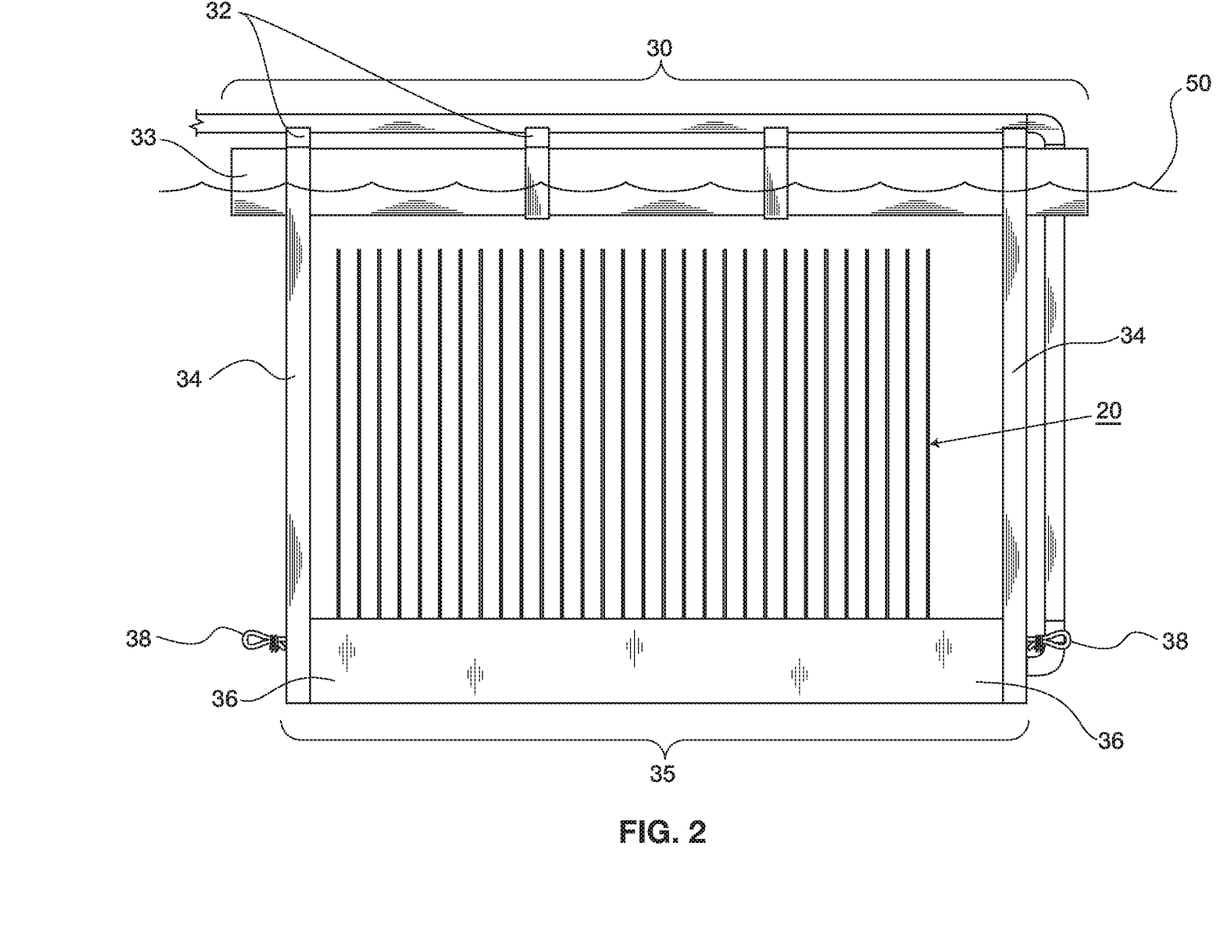
FIG. 2 is a side view depiction of the present invention in water.

Treatment system 10 generally includes a floating support structure that secures a plurality of sheets and aeration components. Referring to FIG. 1, the floating support structure includes flotation assembly 30 having at least one float 33, and preferably at two floats positioned opposite one another. A plurality of flotation cross bars 32 secure and connect the floats one to the other. Vertical frame members 34 connect flotation assembly 30 to base assembly 35. Base assembly 35 includes base frame 36. A plurality of air diffusers 62, and a plurality of sheet anchors 38 span opposite sides of the base frame. Sheet anchors may be segments of metal cable (shown) or a variety of other materials and structures such as metal rods. Piping (not numbered) that transports air to air diffusers may be supported by crossbars 32. The majority of treatment system 10 is beneath surface of water 50.

In a preferred embodiment the support structure is weighted for stabilization, although the system still floats. Weights are preferably positioned on or near the bottom of structure, for example attached to or integrated with base frame 36. In a preferred embodiment (not shown) the base frame includes an internal cavity that is weighted down with, for example, metal, concrete or sand.

Figure 3:
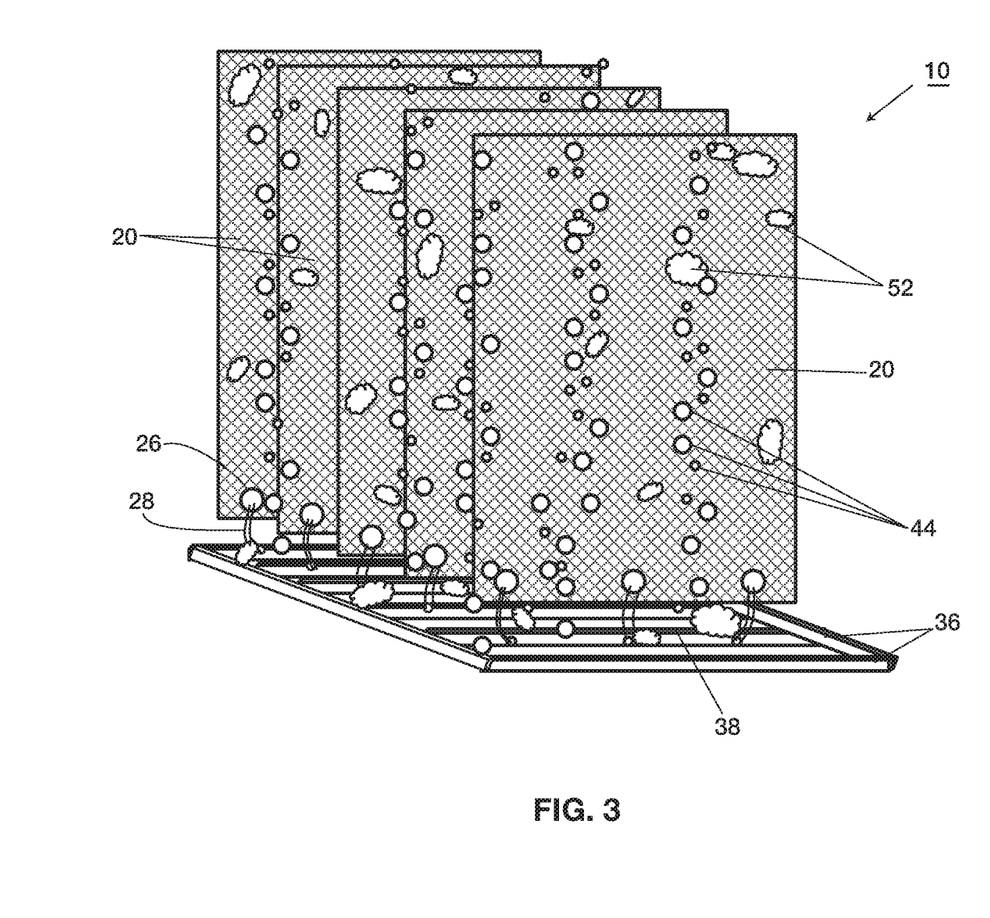
FIG. 3 is a depiction of the present invention with biomass embedded on sheets.
Figure 4:
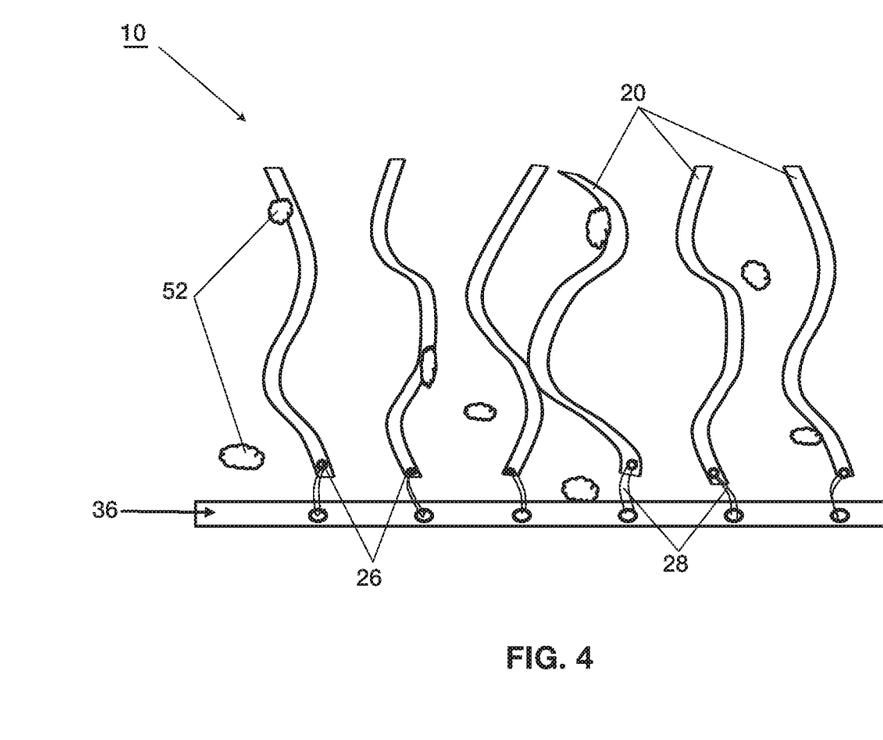
FIG. 4 depicts a side view of freely flexing and swaying sheets.

As shown in FIGS. 1-4, a plurality of sheets 20 are secured along their bottommost edge to sheet anchors 38, which are connected to base frame 36. Sheets are oriented in a substantially vertical position, and may be in parallel, or at an offset angle to each other, or a combination of both. Sheets may be positioned substantially equidistant apart. Attachment sites 26 of sheets 20 may be connected directly to sheet anchor 38, preferably using a grommet or other protective device (not shown). This is shown in FIG. 1. Alternatively, connection means 28, for example a zip-tie or segment of steel wire or cable, may be employed. This is depicted in FIGS. 3 and 4.

Treatment system 10 preferably includes aerator 40 (not shown) that releases air to sheets 20 via diffusers 42. A plurality of spaced apart diffusers is preferred, so as to enable aeration of substantially all regions of substantially all sheets. Aerators and diffusers are preferably adjustable with respect to rate of discharge, and specific diffusers in use, thereby allowing some variability as to regions which receive air, and amount of air received. Aerator 40 and/or air diffuser 42 may be attached to or integrated with the support system, or aerator 40 and/or air diffuser 42 may be physically unconnected to support system but positioned so that air bubbles trickle upward to aerate sheets. As used herein, "air" shall refer to gaseous fluid including but not limited to ambient air, oxygen, nitrogen, and combinations thereof.

Sheets 20 maintain a substantially vertical orientation by employing substrate 21 with a low (approximately 0.88 to approximately 0.98) specific gravity. Due to the buoyance of the sheets it is not necessary to employ structural framework to hold sheets in desired vertical and unfurled position. As depicted in FIGS. 3 and 4 this advantageously allows each sheet to flex and sway, for example due to aeration and current forces, independently of other sheets. This orientation also allows sheets to be easily accessed and replaced as needed, for example due to degradation or mechanical damage, by "pushing aside" surrounding sheets and detaching and adding sheet(s) as desired.

Another advantage of the freely flexing and swaying sheets is that these movements advantageously facilitate the sloughing off of excess biomass. Sheets are preferably positioned apart one-from-another such that each sheet is close enough to come in contact with immediately surrounding sheet(s). This also facilitates sloughing off of excess biomass via sheets "brushing up" against one another.

Figure 5:
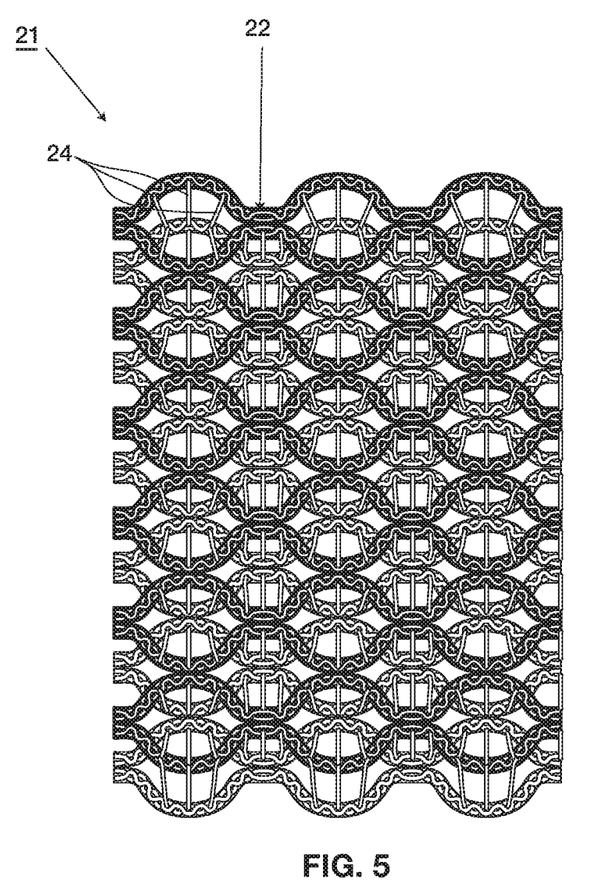
FIG. 5 is a top-view close-up depiction of the substrate.
Figure 6:
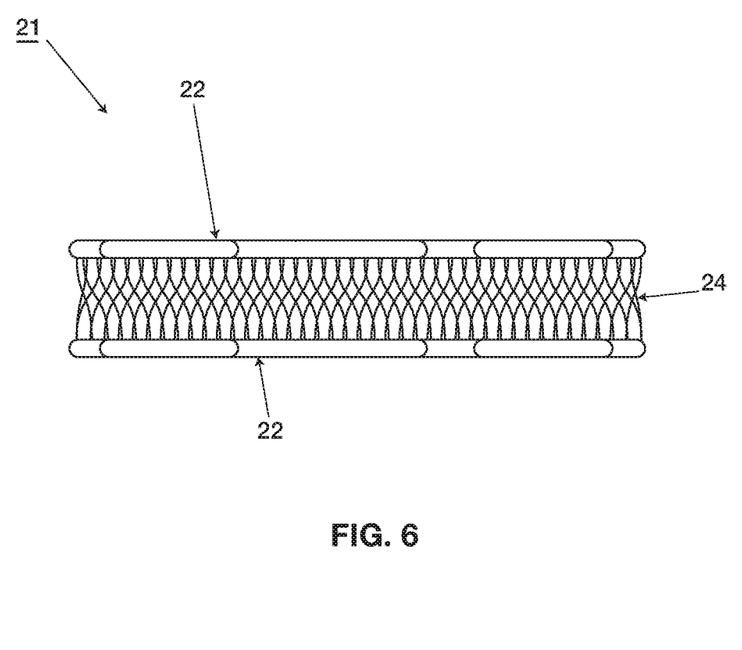
FIG. 6 is a side-view close-up depiction of the substrate.

FIGS. 5 and 6 are close-up depictions of substrate 21 that forms sheets 20. Substrate 21 generally includes two outer surfaces 22, with a plurality of fibers 24 joining the two surfaces. In a preferred embodiment each outer surface is approximately less than 3 mm thick, and the total thickness of the substrate is approximately 3 mm to approximately 20 mm. Outer surfaces preferably have a diamond shaped weave pattern, with the length of the sides of the diamonds being between approximately 5 mm and approximately 20 mm. It should be understood that other weave patterns, for example circles, squares, triangles, hexagons, and so forth, are also within the scope of this invention. This open weave pattern allows gas, nutrient and food to diffuse to the biofilm surfaces at a high rate, which facilitates a high rate of wastewater treatment. It also provides "walls" that physically protect and shield emerging microbial colonies when they are vulnerable. Fibers 24 provide a large amount of surface area per unit of volume of fabric, and provide an ideal environment for microbial attachment and growth. Among the types of microbial growth may include AOB, NOB, PAO and annamox microorganisms.

In a preferred embodiment the substrate has a surface area between approximately 800 and approximately 4,000 square meters per cubic meter, and most preferably between approximately 1,000 and approximately 1,500 square meters per cubic meter. In a preferred embodiment the substrate is constructed of polypropylene, but other plastics such as low density polyethylene or other fibers with a specific gravity of less than approximately 0.94 are also suitable. Apex Mills of Inwood, N.Y. is a source for custom designed 3-D spacer fabric that would be suitable for use in this invention. In one embodiment the specific gravity of the substrate is approximately 0.88 to 0.98, with 0.91 to 0.96 being particularly desirable. The preferred polypropylene material has a specific gravity of 0.91.

Figure 7:
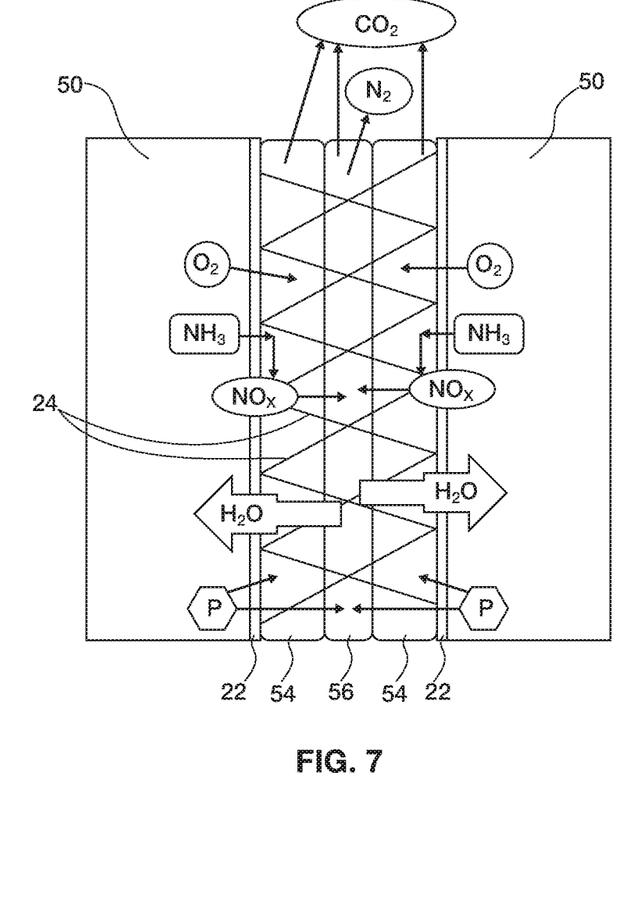
FIG. 7 graphically depicts various metabolic processes performed by the present invention.

The structural characteristics of substrate 21, namely surfaces 22 that allow gas, nutrients and food diffusion in combination with interconnecting fibers 24 that create "deep recesses", allow for the development of a steep and sustained gradient of oxygen concentration to develop within the substrate. The various metabolic processes that take place on surfaces 22, aerobic zone 54 and anoxic zone 56 are schematically depicted in FIG. 7.

Figure 8:
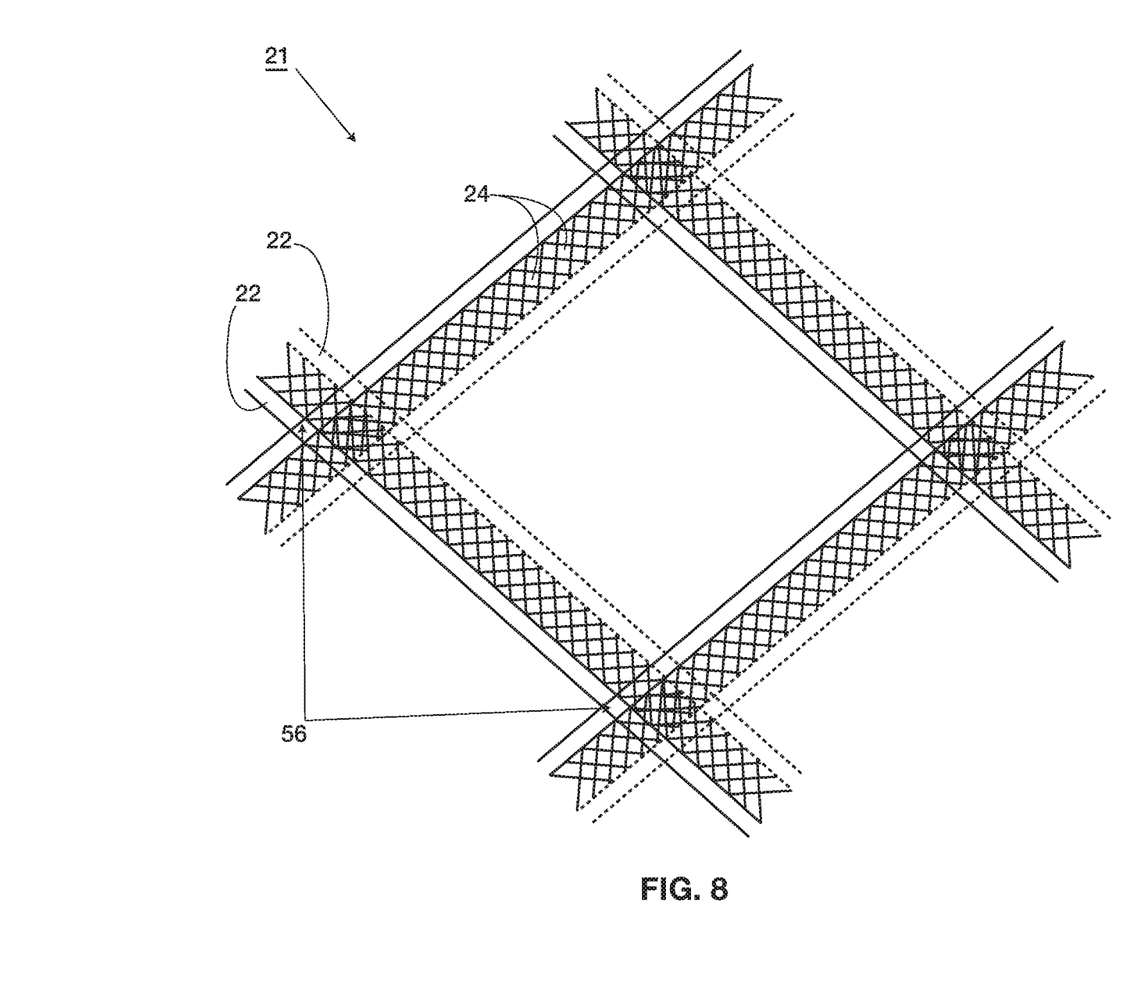
FIG. 8 depicts the oxygen gradient in the substrate.

Referring to FIG. 8 which depicts one "diamond" of substrate 21, areas surrounded by substrate material, for example where edges of diamonds meet, create anoxic zones 56, while areas more central to center of diamond create aerobic zones 54. In the proper operating conditions these microhabitats support life for both aerobic and anaerobic microbes, thereby supporting simultaneous nitrification and denitrification. It is noted that these metabolic activities essentially mimic the desirable action of anammox bacteria, but without the challenges associated with maintaining viable anammox colonies.

In use, a system of the present invention is inserted into a wastewater reservoir in need of treatment, and optionally anchored to keep it from floating from one area to another. The aerator intake is positioned to ensure it is above the surface of the wastewater, or otherwise doesn't suck in wastewater, and aerator parameters such as flow rate are adjusted according to the needs of the specific project. The system is allowed to run, which leads to colonization of substrate by various microbes, and treatment of wastewater by those microbes. The system is preferably periodically examined to ensure integrity of sheets, proper functioning of aerators and diffusers, and so forth. The system can be removed for inspection by lifting the entire assembly from the wastewater.

Specifications of certain structures and components of the present invention have been established in the process of developing and perfecting prototypes and working models. These specifications are set forth for purposes of describing an embodiment, and setting forth the best mode, but should not be construed as teaching the only possible embodiment. Rather, modifications may be made without departing from the spirit and scope of the invention as set forth in the following claims. It should be understood that all specifications, unless otherwise stated or contrary to common sense, are +/−10%, and that ranges of values set forth inherently include those values, as well as all increments between. Moreover, "substantially" and the like shall mean generally true. By way of example, a substantially permanent attachment is capable of removal, but damage is likely to occur. A substantially planar surface may have irregularities.

What is claimed is:

1. A wastewater treatment device comprising:
    A. A plurality of sheets with bottom edges, each of said sheets constructed of a substrate having two outer surfaces connected with a multitude of fibers and a surface area of approximately 1,200 to approximately 1,500 square meters per cubic meter and a specific gravity between 0.88 and 0.98; and
    B. At least one sheet anchor securing said plurality of sheets along said bottom edges only.

2. The wastewater treatment system of claim 1 further including at least one vertical frame member connected to said at least one sheet anchor.

3. The wastewater treatment system of claim 2 further including a flotation assembly connected to said vertical frame member.

4. The wastewater treatment system of claim 3 wherein said flotation assembly includes at least one float.

5. The wastewater treatment system of claim 1 wherein each of said substrates are constructed of a material selected from polypropylene, polyethylene, and combinations thereof.

6. A wastewater treatment system comprising:
    A. A flotation assembly;
    B. At least one vertical frame member connected to said flotation assembly;
    C. A base frame connected to said at least one vertical frame member; and
    D. A plurality of substantially freely flexing and swaying sheets connected to said base frame, said sheets constructed of a woven substrate having two outer surfaces connected with a multitude of fibers and a specific gravity between 0.88 and 0.98.

7. The wastewater treatment system of claim 6 wherein each of said sheets define a bottom edge, each of said plurality of sheets connected to said base frame along said bottom edges only.

8. The wastewater treatment system of claim 6 wherein each of said plurality of sheets is positioned close enough to contact immediately adjacent sheet or sheets.

9. The wastewater treatment system of claim 6 further including at least one colony of aerobic bacteria and at least one colony of anaerobic bacteria.

10. The wastewater treatment system of claim 9 wherein said colonies of aerobic bacteria and anaerobic bacteria are embedded in said multitude of fibers.

11. The wastewater treatment system of claim 6 wherein said sheets are a habitat for organisms selected from the group consisting of plants, molds, fungi, viruses, protozoa, anammox bacteria, and combinations thereof.

12. The wastewater treatment system of claim 6 further including a diffuser emitting a plurality of bubbles, said bubbles in contact with said plurality of sheets.

13. The wastewater treatment system of claim 6 further including weights coupled with said base frame.

14. A method of treating wastewater including the acts of:
   A. Anchoring a plurality of substantially freely flexing and swaying sheets in parallel to a base assembly, each of said sheets constructed of a woven substrate having two outer surfaces connected with a multitude of fibers and a specific gravity between 0.88 and 0.98;
   B. Introducing said base assembly into a repository of wastewater wherein said base assembly is suspended in said wastewater; and
   C. Allowing said sheets to colonize with aerobic and anaerobic microbes.

15. The method of claim 14 wherein said act of anchoring a plurality sheets consists of the act of anchoring said sheets along only the bottom edges.

16. The method of claim 14 further including the act of aerating said sheets.

\* \* \* \* \*